(12) United States Patent
Byrnes et al.

(10) Patent No.: US 6,844,515 B2
(45) Date of Patent: Jan. 18, 2005

(54) METHOD AND APPARATUS FOR TURBINE BLADE MACHINING

(76) Inventors: Brett Wayne Byrnes, 61 Armin Rd., Tijeros, NM (US) 87059; James Henry Madge, 3760 Pocahontas Ave., Cincinnati, OH (US) 45227; Betsy Weddendorf, 9091 Mt. Tabor Rd., Aurora, IN (US) 47001

( * ) Notice: Subject to any disclaimer, the term of this patent is extended or adjusted under 35 U.S.C. 154(b) by 0 days.

(21) Appl. No.: 09/974,445

(22) Filed: Oct. 10, 2001

(65) Prior Publication Data

US 2003/0066820 A1 Apr. 10, 2003

(51) Int. Cl.$^7$ .............................. B23H 1/00; B23H 9/10
(52) U.S. Cl. ............................. 219/69.11; 219/69.17; 269/224; 269/236
(58) Field of Search ................................. 269/224, 236, 269/254 R; 219/69.17, 69.11

(56) References Cited

U.S. PATENT DOCUMENTS

| | | | | |
|---|---|---|---|---|
| 3,331,166 | A | * | 7/1967 | Brenning |
| 3,558,843 | A | * | 1/1971 | O'Connor |
| 3,827,965 | A | * | 8/1974 | Andrews |
| 4,638,602 | A | * | 1/1987 | Cavalieri |
| 4,829,720 | A | * | 5/1989 | Cavalieri |
| 5,544,873 | A | | 8/1996 | Vickers et al. |
| 5,813,593 | A | | 9/1998 | Galaske, Jr. |
| 5,847,350 | A | | 12/1998 | Dorrel et al. |
| 5,951,884 | A | * | 9/1999 | Futamura |
| 6,068,541 | A | * | 5/2000 | Dwyer |
| 6,158,104 | A | | 12/2000 | Roberts et al. |
| 6,287,182 | B1 | * | 9/2001 | Dwyer |
| 6,595,401 | B2 | * | 7/2003 | Collot et al. |

* cited by examiner

Primary Examiner—Geoffrey S. Evans
(74) Attorney, Agent, or Firm—William Scott Andes; Armstrong Teasdale LLP

(57) ABSTRACT

An apparatus for machining a turbine blade assembly includes at least one locator for positioning the blade assembly with respect to the apparatus. The apparatus also includes at least one biasing mechanism for maintaining a relative position of the blade assembly with respect to said apparatus and at least one clamping device that includes a predetermined locking position. The clamping device retains the blade assembly.

17 Claims, 4 Drawing Sheets

METHOD AND APPARATUS FOR TURBINE BLADE MACHINING

BACKGROUND OF THE INVENTION

This invention relates generally to gas turbine engine blade assemblies and, more particularly, to an apparatus for machining blade assemblies.

A gas turbine engine typically includes a core engine having, in serial flow arrangement, a high pressure compressor which compresses airflow entering the engine, a combustor which burns a mixture of fuel and air, and a turbine which includes a plurality of blade assemblies that extract rotational energy from airflow exiting the combustor. Because the turbine is subjected to high temperature airflow exiting the combustor, turbine components are cooled to reduce thermal stresses that may be induced by the high temperature airflow.

The rotating blades include hollow airfoils that are supplied cooling air through cooling channels. The airfoils include a cooling cavity bounded by sidewalls that define the cooling cavity. The cooling cavity is partitioned into cooling chambers that define flow paths for directing the cooling air.

During rotor blade manufacture, openings are formed along the airfoil for discharging cooling air from the airfoil cavity. More specifically, an electric discharge machining (EDM) process is used to extend the openings from the airfoil trailing edge into the airfoil cavity. At least some known EDM fixtures are used to machine turbine blade assemblies. Because of a curvature of the airfoil, accurately forming the openings in the airfoil may be a time consuming and difficult task. To facilitate improving the EDM process, a clamping apparatus is used to secure the blade assembly. At least some known clamping assemblies are complex and expensive. Consistent, repeatable locating and securing of blade assemblies facilitates precision machining.

BRIEF DESCRIPTION OF THE INVENTION

In one aspect, a method of securing a blade assembly for machining using an apparatus is provided. The blade assembly includes a turbine airfoil and a platform extending from the turbine airfoil. The turbine airfoil includes a leading edge and a trailing edge. The method includes providing an apparatus that includes at least one locator, at least one biasing mechanism, and at least one clamping device. The method further includes positioning the blade assembly against the apparatus locator, positioning the blade assembly against the apparatus biasing mechanism, and securing the blade assembly relative to the apparatus using the clamping device.

In another aspect, an apparatus is provided for machining a turbine blade assembly that includes at least one locator for positioning the blade assembly with respect to the apparatus. The apparatus also includes at least one biasing mechanism for maintaining a relative position of the blade assembly with respect to said apparatus and at least one clamping device that includes a predetermined locking position. The clamping device retains the blade assembly.

In a further aspect, an electric discharge machining (EDM) assembly is provided comprising an EDM fixture, an electrode holder, and an apparatus. The apparatus includes at least one locator, at least one biasing mechanism, and at least one clamping device including a predetermined locking position. The apparatus is configured to secure a blade assembly with respect to the EDM fixture.

DETAILED DESCRIPTION OF THE INVENTION

Figure 1:
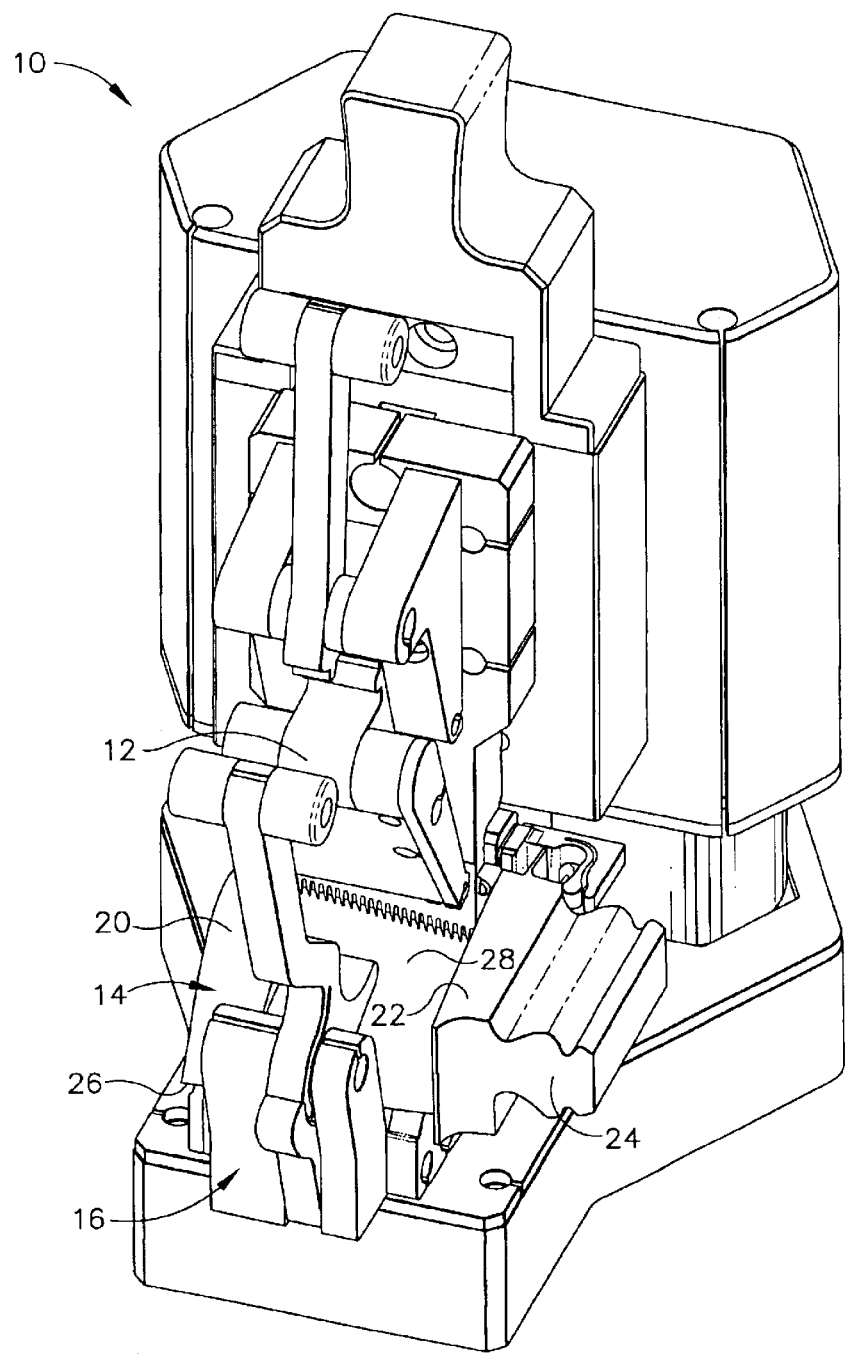
FIG. 1 is schematic illustration of an EDM fixture.

FIG. 1 is a schematic illustration of an EDM fixture 10 including an EDM electrode holder 12, a turbine blade assembly 14, and a clamping apparatus 16. In an exemplary embodiment, turbine blade assembly 14 includes a turbine airfoil 20, a platform 22 extending from turbine airfoil 20, and a shank 24 that extends from platform 22. Turbine airfoil 20 includes a trailing edge 26 and a suction side 28. EDM fixture 10 facilitates forming cooling passages (not shown in FIG. 1) in suction side 28. EDM electrode holder 12 is positioned adjacent suction side 28 and apparatus 16 maintains blade assembly 14 in a fixed position relative to EDM electrode holder 12. More specifically, apparatus 16 secures blade assembly 14 relative to apparatus 16 such that suction side 28 is exposed to EDM electrode holder 12.

Figure 2:
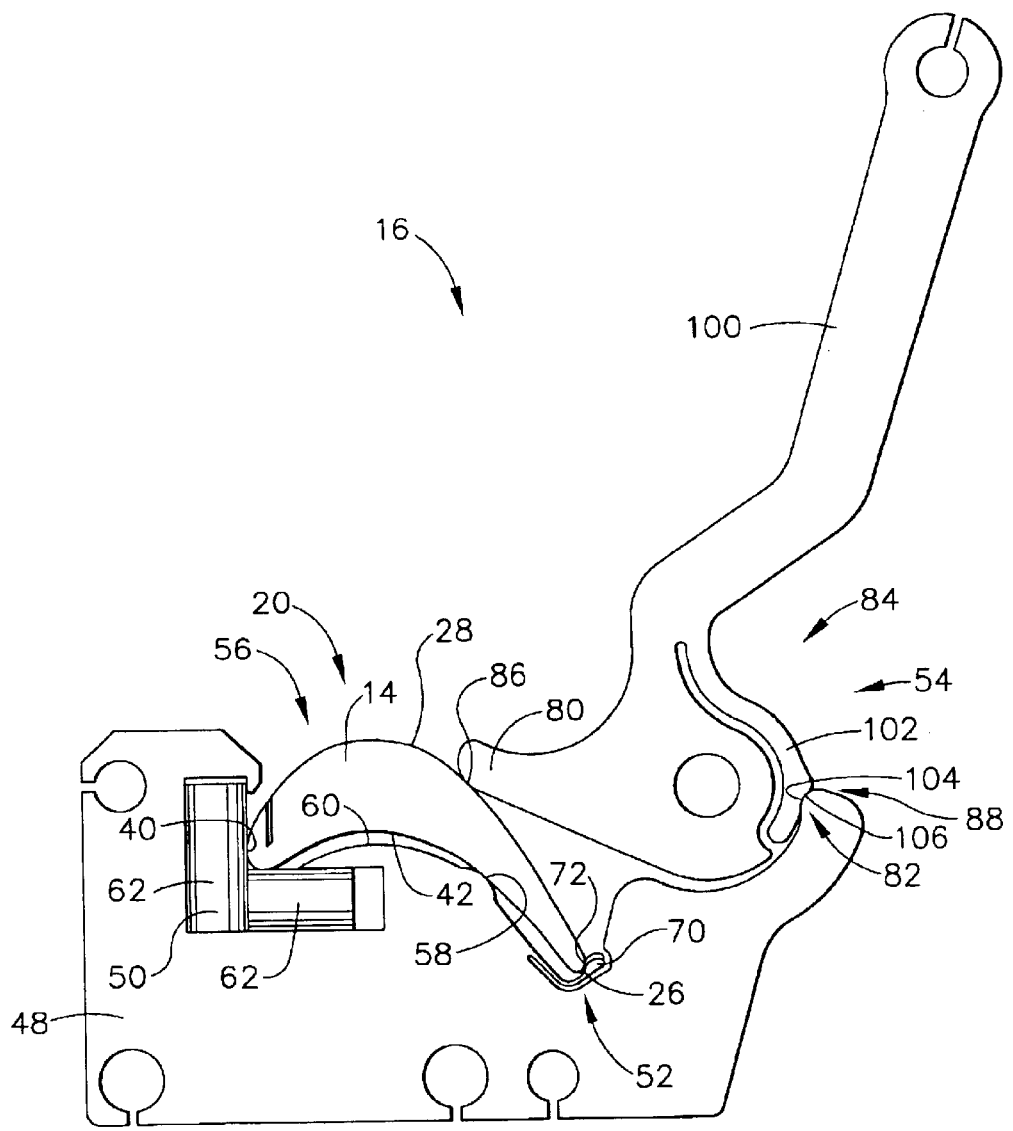
FIG. 2 is a side, cross-sectional view of an apparatus shown in FIG. 1.

FIG. 2 is a side, cross-sectional view of apparatus 16. In addition to trailing edge 26 and suction side 28, turbine airfoil 20 also includes a leading edge 40 and a pressure side 42. Pressure side 42 and suction side 28 are connected at trailing edge 26 and leading edge 40.

Apparatus 16 includes a base 48, locators 50, biasing mechanisms 52, and a clamping device 54 that is connected to base 48. Base 48 is configured to be secured to EDM fixture 10 (shown in FIG. 1) and defines a cavity 56 sized to receive blade assembly 14 therein. Locators 50 extend from base 48 adjacent cavity 56 and contact airfoil leading edge 40 to facilitate positioning blade assembly 14 relative to apparatus 16. Locators 50 include a boss 58 that extends from base 48 to contact airfoil pressure side 42. In one embodiment, base 48 includes an arcuate center portion 60 that supports boss 58. In another embodiment, boss 58 is rotatable and removable, including, for example, a ball-bearing (not shown).

Locators 50 include dowels 62 positioned in base 48 to contact airfoil leading edge 40. Dowels 62 are mounted in base 48 and facilitate non-deforming contact between locators 48 and blade assembly 14, particularly during positioning and securing of blade assembly 14. In the exemplary embodiment, four dowels 62 are substantially mutually perpendicular and make multiple contact with leading edge 40. Four dowels 62 facilitate stable, precise positioning of blade assembly 14 in apparatus 16. In one embodiment, dowels 62 may be indexed and rotated to maintain precise positioning of and contact with blade assembly 14. In an alternative embodiment (not shown), apparatus 16 can include more than four or less than four dowels 62. In an alternative embodiment (not shown), dowels 62 contact pressure side 42 and suction side 28 adjacent leading edge 40.

Biasing mechanisms 52 extend from base 48 into cavity 56 and are configured to contact blade assembly 14. More specifically, biasing mechanisms 52 are configured to abut blade assembly 14 and bias blade assembly 14 generally against locators 50. In the exemplary embodiment, biasing mechanisms 52 include a leaf spring 70 that provides a spring seat 72. Spring seat 72 facilitates contact with airfoil trailing edge 26 and leaf spring 70 biases airfoil 20 against dowels 62 such that leading edge 40 is maintained in contact with apparatus 16.

Clamping device 54 is coupled to base 48 generally opposite locators 50. Clamping device 54 includes a securing member 80 and a locking mechanism 82. Clamping device 54 can be operated between an open position (not shown in FIG. 2) and a clamping position 84. Securing member 80 extends from clamping device 54 and includes a contact portion 86. Securing member 80 contacts airfoil 20 when blade assembly 14 is positioned in cavity 56 and clamping device 54 is in clamping position 84.

Locking mechanism 82 extends from clamping device 54 and includes a predetermined locking position 88. In the exemplary embodiment, clamping device 54 is rotatably coupled to base 48 by rod 90. Clamping device 54 is rotated by movement of an operating member 100 between the open position (not shown in FIG. 2) and clamping position 84. Locking mechanism 82 includes a leaf spring 102, a locking groove 104, and a locking tab 106 that extends from base 50. Locking groove 104 engages locking tab 106 to establish predetermined locking position 86. Rotation of clamping device 54 with operating member 100 disengages locking groove 104 from locking tab 106 and shifts clamping device 54 to the open position. In another embodiment, locking tab 106 extends from leaf spring 102 and locking groove 104 is defined in base 50.

Figure 3:
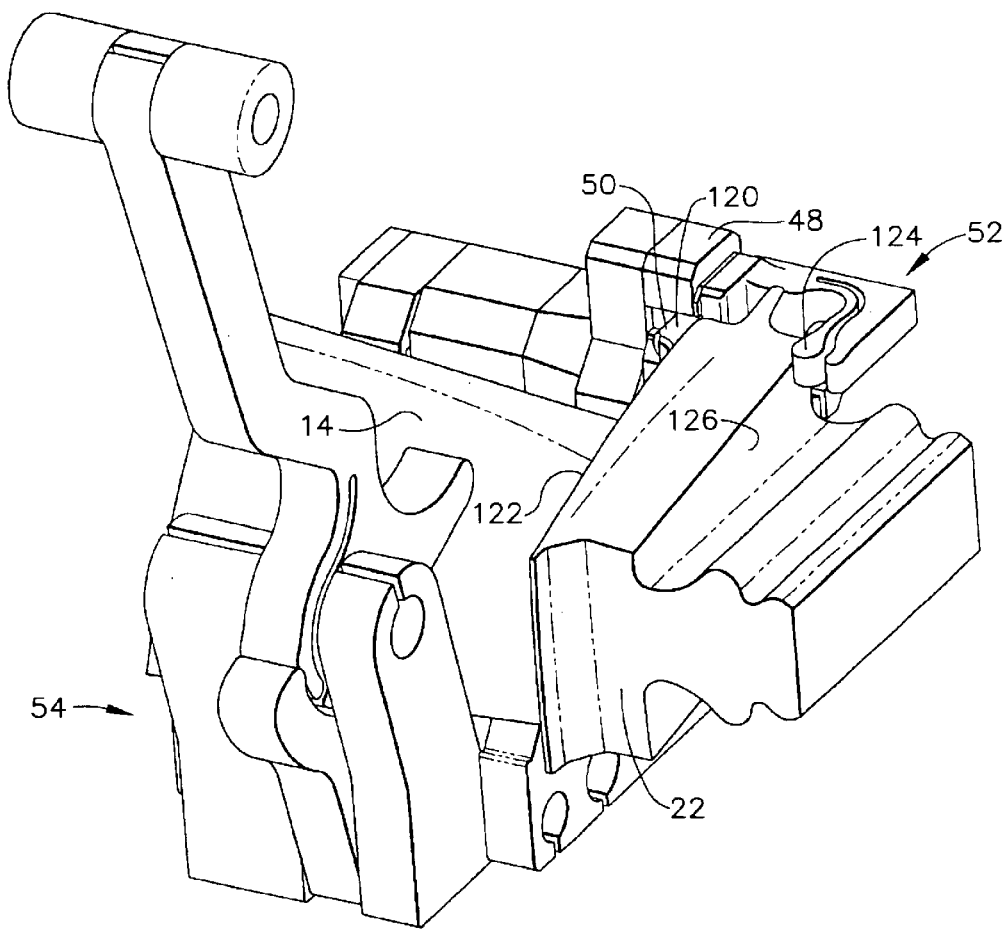
FIG. 3 is a partial, perspective view of an apparatus and a blade assembly that may be used with the EDM fixture shown in FIG. 1.

FIG. 3 is a partial, perspective view of apparatus 16 and blade assembly 14. Locator 50 contacts blade assembly platform 22. Biasing mechanism 52 also contacts platform 22 and cooperates with locator 50 to provide stable positioning of platform 22. In the exemplary embodiment, locator 50 includes a pin 120 that extends from base 48 and is configured to abut a platform upper surface 122. Pin 120 extends from base 48 substantially opposite from clamping device 54. In one embodiment, biasing mechanism 52 includes a leaf spring 124 that biases platform 22 against pin 120. More specifically, leaf spring 124 contacts a platform lower surface 126 and biases platform upper surface 122 against pin 120. In another embodiment, the relative locations of pin 120 and leaf spring 124 are reversed. In still another embodiment, pin 120 and leaf spring 124 extend from base 48 adjacent clamping device 54.

Figure 4:
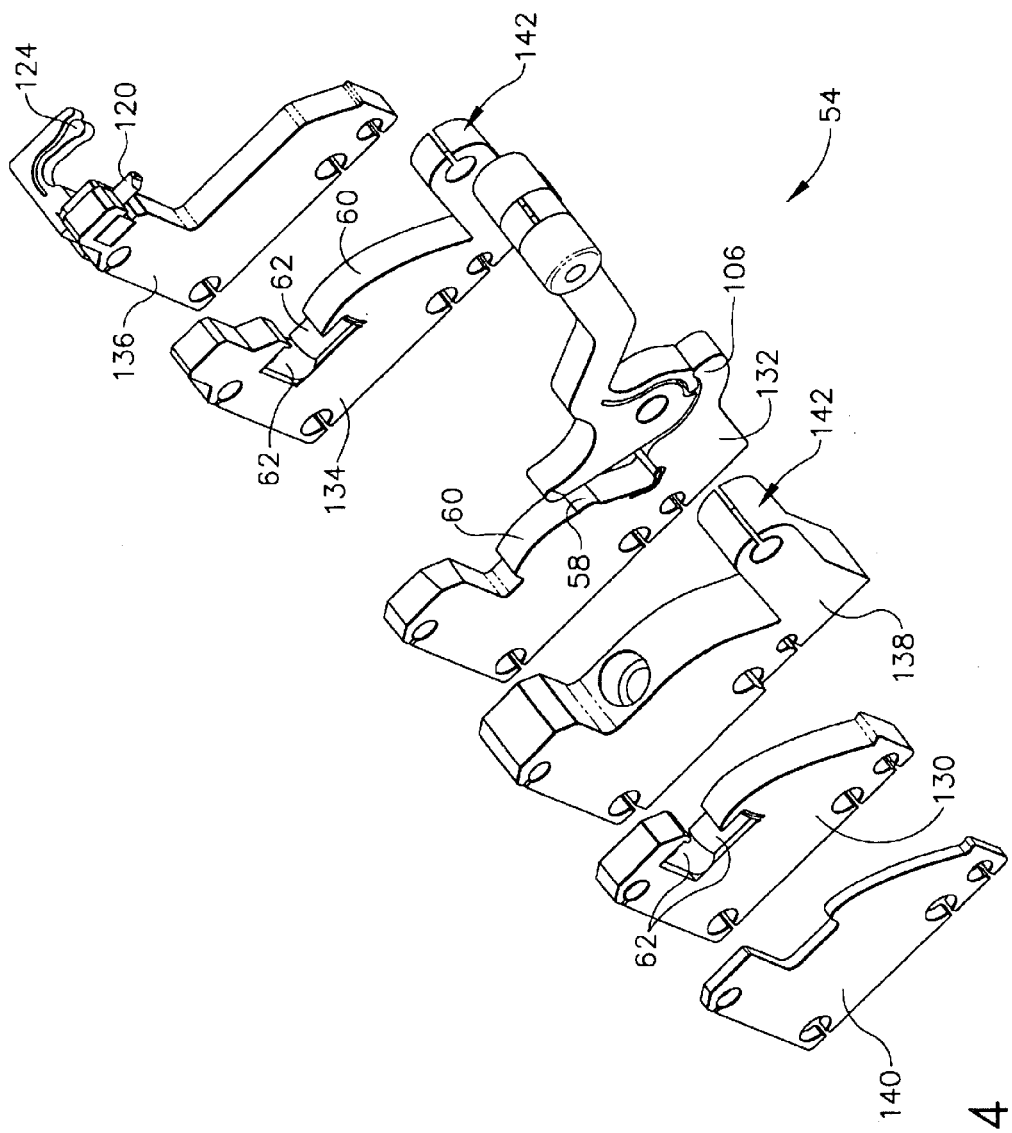
FIG. 4 is an exploded perspective view of an apparatus shown in FIG. 2.

FIG. 4 is an exploded perspective view of apparatus 16. In the exemplary embodiment, locators 50, biasing mechanism 52, and clamping device 54 are located on separable, stackable plates 130, 132, 134, 136, and 138, which together form base 48. In one embodiment, apparatus 16 also includes a stackable end plate 140. More specifically, stackable plates 130 and 134 include dowels 62 that are positioned to receive airfoil leading edge 40. Stackable plate 136 includes pin 120 and leaf spring 124, that are stackable plate 132 includes boss 58 and locking tab 106. Stackable plate 132 is configured to accept and facilitate the rotation of clamping device 54. Stackable plates 134 and 138 include hub portions 142 that retain rod 90 to facilitate the rotation of clamping device 54. Stackable plate 138 also maintains the desired positioning of plates containing locators 50 and is sized to accommodate specific blade assemblies 14.

In the exemplary embodiment, multiple plates 130, 132, and 134 include arcuate center portions 60. Stackable plate 138 includes a recessed center portion 144 that is recessed relative to center portions 60 to facilitate use with different sized apparatuses 16.

Each stackable plate 130, 132, 134, 136, 138, and end plate 140 include alignment devices 146. Alignment devices 146 facilitate aligning stackable plates 130, 132, 134, 136, 138, and end plate 140. In the exemplary embodiment, alignment devices 146 include alignment channels 148, which accept alignment dowels (not shown). The alignment dowels also secure stackable plates 130, 132, 134, 136, 138, and end plate 140 together as apparatus 16. Alignment dowels may also serve to mount apparatus 16 to EDM fixture 10.

During operation, apparatus 16 is assembled from the selected stackable plates 130, 132, 134, 136, 138, and end plate 140, including rotabaly securing clamping device 54 with rod 90 adjacent plate 132. Stackable plates 130, 132, 134, 136, 138, and end plate 140 are aligned and secured together to form apparatus 16. Apparatus 16 is mounted to fixture 10 using alignment channels 148 and the alignment dowels. Clamping device 54 is shifted to the open position to facilitate positioning of blade assembly 14. Airfoil leading edge 40 is positioned in contact with dowels 62 and platform 22 is positioned between pin 120 and leaf spring 124. Airfoil trailing edge 26 is then positioned on spring seat 72, facilitating leaf spring 70 biasing blade assembly 14 against locators 50. In another embodiment, airfoil trailing edge 26 is positioned on spring seat 72 prior to positioning leading edge 40 against dowels 62 and platform 22 between pin 120 and leaf spring 124. Use of dowels 62 and pin 120 provide precision, repeatable contact and locating of airfoil 20 with respect to apparatus 16.

Operating member 100 is operated to rotate clamping device 54 such that contact portion 86 contacts suction side 28. Operating member 100 is further rotated to shift locking mechanism 82 into predetermined locking position 88, such that locking tab 106 is received in locking groove 104. Clamping device 54 biases turbine airfoil 20 against dowels 62, boss 58 and biasing mechanism 52. Pin 120 and leaf spring 124 constrain lateral movement of blade assembly 14. Locking mechanism 82 facilitates application of uniform force by clamping device 54. Uniform clamping force aids in the uniform positioning of blade assemblies 14 for machining in EDM fixture 10.

The above-described machining apparatus are cost-effective and highly reliable. The apparatus includes locators, biasing mechanisms, and a clamping device for securing a turbine blade assembly for machining in a uniform, repeatable manner. The apparatus is fixed relative to an EDM fixture and an EDM electrode holder. During operation, the blade assembly is positioned against the locators and the biasing mechanism. The blade assembly is secured relative to the apparatus using a clamping device including a locking mechanism with a predetermined locking position. As a result, blade assemblies are uniformly positioned in the EDM fixture under an EDM electrode holder. Thus, the apparatus facilitates efficient and uniform machining.

While the invention has been described in terms of various specific embodiments, those skilled in the art will recognize that the invention can be practiced with modification within the spirit and scope of the claims.

What is claimed is:

1. A method of securing a blade assembly for machining using an apparatus, the blade assembly including a turbine airfoil and a platform extending from the turbine airfoil, the turbine airfoil including a leading edge and a trailing edge, said method comprising:

providing an apparatus including at least one locator, at least one biasing mechanism and at least one clamping device;

positioning the blade assembly against the apparatus locator;

positioning the airfoil trailing edge against a first biasing mechanism;

positioning the platform against a second biasing mechanism; and securing the blade assembly relative to the apparatus using the clamping device.

2. A method in accordance with claim 1 wherein positioning the blade assembly against the apparatus locator further comprises:

positioning the airfoil leading edge against a first locator; and positioning the platform against a second locator.

3. A method in accordance with claim 1 wherein securing the blade assembly further comprises applying a force to the blade assembly by rotating a clamping device to a determined locking position.

4. An apparatus for machining a turbine blade assembly, said apparatus comprising:

at least one locator for positioning the blade assembly with respect to said apparatus;

at least one biasing mechanism for maintaining a relative position of the blade assembly with respect to said apparatus; and at least one clamping device rotatably coupled to said apparatus, said at least one clamping device comprising a predetermined locking position, said clamping device for retaining the blade assembly.

5. An apparatus in accordance with claim 4 wherein said at least one locator comprises a plurality of locators configured to contact the blade assembly to position the blade assembly with respect to said apparatus.

6. An apparatus in accordance with claim 5 wherein said plurality of locators comprises at least one pair of mutually peipendicular dowels.

7. An apparatus in accordance with claim 4 wherein said at least one locator, said at least one biasing mechanism, and said at least one clamping device are located on separable stacked plates.

8. An apparatus in accordance with claim 4 wherein said at least one locator comprises at least one locating pin configured to contact the turbine blade assembly.

9. An apparatus in accordance with claim 8 wherein said locating pin opposes and extends towards said at least one clamping device.

10. An apparatus in accordance with claim 4 wherein said at least one biasing mechanism comprises at least one spring configured to bias the turbine blade assembly in a pre-determined position with respect to said apparatus.

11. An electric discharge machining (EDM) assembly comprising:

an EDM fixture;

an electrode holder; and an apparatus comprising at least one locator, at least one biasing mechanism, and at least one clamping device coupled to said apparatus, said at least one clamping device comprising a locking mechanism comprising a predetermined looking position, said apparatus configured to secure a blade assembly with respect to said EDM fixture, said at least one biasing mechanism comprises at least one spring configured to bias the blade assembly in a pre-determined position with respect to said apparatus.

12. An EDM fixture in accordance with claim 11 wherein said at least one clamping device rotatably coupled to said apparatus.

13. An EDM fixture in accordance with claim 11 wherein said at least one locator, said at least one biasing mechanism, and said at least one clamping device are located on separable stacked plates.

14. An EDM fixture in accordance with claim 11 wherein said at least one locator comprises a plurality of locators configured to contact the blade assembly to position the blade assembly with respect to said apparatus.

15. An EDM fixture in accordance with claim 14 wherein said plurality of locators comprise at least one pair of mutually perpendicular locating dowels.

16. An EDM fixture in accordance with claim 11 wherein said at least one locator comprises at least one locating pin configured to contact the blade assembly.

17. An EDM fixture in accordance with claim 11 wherein said locating pin opposes and extends towards said at least one clamping device.

* * * * *

UNITED STATES PATENT AND TRADEMARK OFFICE
CERTIFICATE OF CORRECTION

| | | |
|---|---|---|
| PATENT NO. | : 6,844,515 B2 | Page 1 of 1 |
| APPLICATION NO. | : 09/974445 | |
| DATED | : January 18, 2005 | |
| INVENTOR(S) | : Byrnes et al. | |

It is certified that error appears in the above-identified patent and that said Letters Patent is hereby corrected as shown below:

In Claim 11, column 6, line 17, delete "looking" and insert therefor -- locking --.

Signed and Sealed this

Eighteenth Day of September, 2007

JON W. DUDAS
*Director of the United States Patent and Trademark Office*

UNITED STATES PATENT AND TRADEMARK OFFICE
CERTIFICATE OF CORRECTION

PATENT NO. : 6,844,515 B2 Page 1 of 1
APPLICATION NO. : 09/974445
DATED : January 18, 2005
INVENTOR(S) : Byrnes et al.

It is certified that error appears in the above-identified patent and that said Letters Patent is hereby corrected as shown below:

In Claim 11, column 6, line 17, delete "looking" and insert therefor -- locking --.

Signed and Sealed this

Sixth Day of November, 2007

JON W. DUDAS
*Director of the United States Patent and Trademark Office*